(12) United States Patent
Peterson et al.

(10) Patent No.: US 7,272,515 B2
(45) Date of Patent: Sep. 18, 2007

(54) DIGITAL SIGNAL PROCESSOR IMPLEMENTATION OF HIGH IMPEDANCE FAULT ALGORITHMS

(75) Inventors: John M. Peterson, Jeffersonville, PA (US); Steven A. Kunsman, Allentown, PA (US); Mohamed Y Haj-Maharsi, Raleigh, NC (US); Reynaldo Nuqui, Cary, NC (US); James Stoupis, Raleigh, NC (US)

(73) Assignees: ABB Technology AG, Zurich (CH); ABB Research Ltd., Zurich (CH)

( * ) Notice: Subject to any disclaimer, the term of this patent is extended or adjusted under 35 U.S.C. 154(b) by 0 days.

(21) Appl. No.: 11/081,042

(22) Filed: Mar. 15, 2005

(65) Prior Publication Data

US 2005/0231862 A1    Oct. 20, 2005

Related U.S. Application Data

(60) Provisional application No. 60/533,504, filed on Mar. 16, 2004.

(51) Int. Cl.
    *G01R 31/00*    (2006.01)
(52) U.S. Cl. .......................................... 702/59

(58) Field of Classification Search .................. 702/59, 702/58, 60, 61, 62, 64; 324/500, 512, 527, 324/528
See application file for complete search history.

(56) References Cited

U.S. PATENT DOCUMENTS

| 5,475,556 | A |   | 12/1995 | Yoon et al. |
| 5,485,093 | A | * | 1/1996  | Russell et al. ............... 324/522 |
| 5,514,965 | A | * | 5/1996  | Westwood .................. 324/533 |
| 5,550,751 | A |   | 8/1996  | Russell |
| 5,602,709 | A |   | 2/1997  | Al-Dabbagh |

FOREIGN PATENT DOCUMENTS

JP       2093826      4/1990

\* cited by examiner

*Primary Examiner*—John Barlow
*Assistant Examiner*—Cindy D. Khuu
(74) *Attorney, Agent, or Firm*—Paul R. Katterle; Michael M. Rickin

(57) ABSTRACT

A digital signal processor implementation of three algorithms used to detect high impedance faults. The algorithms can be wavelet based, higher order statistics based and neural network based. The algorithms are modified to process one second of data instead of ten seconds of data and a double buffered acquisition is connected to the output of the algorithms.

11 Claims, 1 Drawing Sheet

DIGITAL SIGNAL PROCESSOR IMPLEMENTATION OF HIGH IMPEDANCE FAULT ALGORITHMS

CROSS REFERENCE TO RELATED APPLICATION

This application claims the priority of U.S. provisional patent application Ser. No. 60/553,504 filed on Mar. 16, 2004, entitled "Digital Signal Processor Implementation Of High Impedance Fault Algorithms" the contents of which are relied upon and incorporated herein by reference in their entirety, and the benefit of priority under 35 U.S.C. 119(e) is hereby claimed.

FIELD OF THE INVENTION

This invention relates to algorithms for determining the occurrence of a high impedance fault (HIF) condition and more particularly to the implementation of those algorithms using a digital signal processor (DSP) in a relay platform.

DESCRIPTION OF THE PRIOR ART

Electric utility companies use overhead energized conductors to transport electrical energy to consumers. There are over one million miles of overhead distribution lines in the United States, supplying energy for industrial, commercial, and residential customers. The overhead conductors are exposed to the elements and to abnormal conditions. In some cases, the conductors fall to the ground and, depending on the surface, establish a conducting path. If the surface is grass, soil, or asphalt, a HIF occurs, in which case the fault current is much smaller than that of a typical phase-to-ground fault. This smaller fault current makes detection of such instances difficult with conventional protection devices.

The danger with downed or open conductors is the risk of public contact with the energized lines. Human contact with downed conductors can result in serious injury or even death. The problem is further complicated once a downed conductor is detected. If a relay trips a circuit breaker at a substation, the loss of power to vital public entities, such as hospitals, airports, and traffic signals, can result in life-threatening situations of equal or greater magnitude. Thus, the problems facing protection engineers are to first detect the disturbances and then to react appropriately.

U.S. patent application Ser. No. 10/770,270 filed on Feb. 2, 2004 and entitled "High Impedance Fault Detection" ("the '270 application"), the disclosure of which is hereby incorporated herein by reference, and is assigned to the same assignee as the present invention, describes the implementation in a relay platform of three detection algorithms that each use various features of phase and/or ground currents to individually detect a HIF. The HIF detection algorithms described in the '270 application are wavelet based, higher order statistics based and neural network based. It is desirable to implement the three algorithms with a DSP as the DSP is needed for data acquisition and scaling and performs some of the work so that the CPU (central processing unit) in the relay does not have to do everything but:

each of the algorithms in their original formats cover 10 seconds worth of data and thus need a lot of computation power and precision; and it is impossible to implement the algorithms in their original formats due to hardware limitations and floating-point computations requirements.

The present invention allows the three detection algorithms to be implemented on the relay platform with a DSP. In accordance with the present invention:

the algorithms are modified to process one (1) second of data instead of 10 seconds and circular buffering and accumulation techniques are used to achieve the solution;

double buffering is used for the acquisition; and there is a fixed-point implementation of each algorithm.

SUMMARY OF THE INVENTION

A method for detecting high impedance faults in electrical power lines. The method comprises:

using a plurality of high impedance fault detection means each having an output for independently detecting the high impedance fault, each of the fault detection means detecting the high impedance faults by analyzing data from the power lines collected for a predetermined period of time and providing at the output a signal based on the analyzed data indicative of the occurrence or non-occurrence of the high impedance faults;

modifying each of the plurality of fault detection means to reduce the predetermined period of time by a factor of 1/n where n is an integer greater than one; and connecting a buffering system to the output of each of the fault detection means to obtain from the buffering system a signal indicative of the occurrence or non-occurrence of the high impedance fault that is based on the data collected for the predetermined period of time.

A system for detecting high impedance faults in electrical power lines. The system comprises:

a plurality of high impedance fault detection means each having an output for independently detecting the high impedance fault, each of the fault detection means detecting the high impedance faults by analyzing data from the power lines collected for a predetermined period of time and providing at the output a signal based on the analyzed data indicative of the occurrence or non-occurrence of the high impedance faults, each of the plurality of fault detection means modified to reduce the predetermined period of time by a factor of 1/n where n is an integer greater than one; and a buffering system connected to the output of each of the fault detection means to obtain from the buffering system a signal indicative of the occurrence or non-occurrence of the high impedance fault that is based on the data collected for the predetermined period of time.

A processing apparatus for determining the occurrence of a high impedance fault in electrical power lines. The processing apparatus comprises:

two buffers each for storing data collected from the power lines for a first predetermined period of time indicative of current flow on the power lines;

a plurality of high impedance fault means each having an output for individually detecting a high impedance fault on the power lines, each of the fault detection means alternately processing for the first predetermined period of time first the data stored in one of the two buffers and then the data stored in the other of the two buffers, each of the high impedance fault detection means providing at the output a signal based on the processed data indicative of the occurrence or non-occurrence of the high impedance faults; and a buffering system connected to the output of each of the high impedance fault detection means for obtaining a signal indicative of the occurrence or non-occurrence of the high impedance fault that is based on the data collected for a second predetermined period of time that is n times the first predetermined period time where n is an integer that is two or greater.

DESCRIPTION OF THE PREFERRED EMBODIMENT(S)

Figure 1:
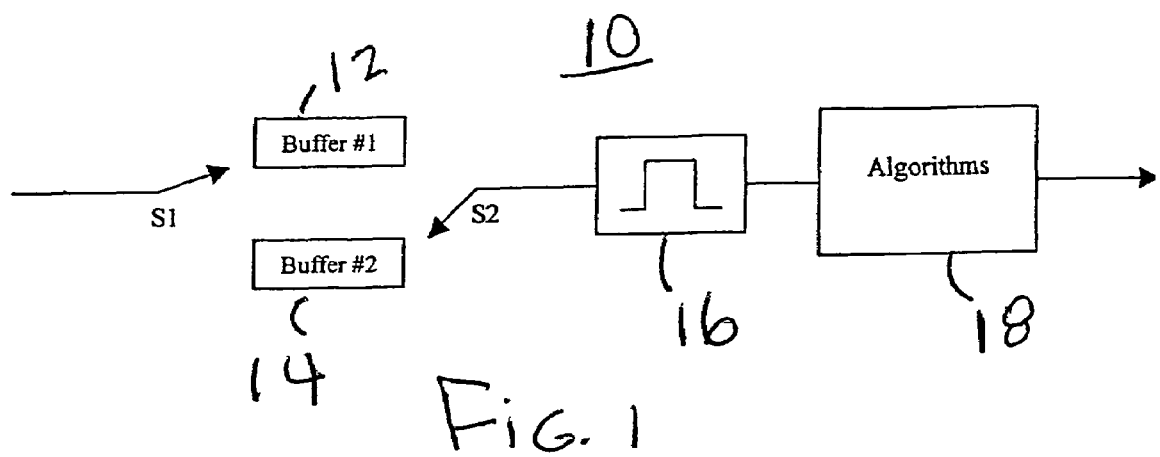
FIG. 1 shows a block diagram for the double buffered acquisition system used in the system of the present invention.

Referring now to FIG. 1, there is shown a block diagram for the double buffered acquisition system 10. System 10 uses a first buffer 12 and a second buffer 14 to store data. While system 10 is storing incoming data in the first buffer 12, the processing is performed on data already stored in the second buffer 14. When the first buffer 12 is filled, the switch S1 is switched to the second buffer 14 and the switch S2 is switched to the first buffer 12. The switches S1 and S2 switch back and forth every time a buffer is filled. Buffers 12 and 14 are sized to each hold one (1) second worth of data.

A band-pass filter 16 processes the data from buffer 12 or 14 and passes the filtered data to be analyzed by the algorithms 18 as shown in FIG. 1. The algorithms 18 are the three detection algorithms, namely, wavelet based, higher order statistics based and neural network based, described in the '270 application Even though the processor time-step is equal to 32 cycles/second the results are refreshed every second since it takes one second to process a buffer worth of data.

Each of the algorithms 18 in their format described in the '270 application cover ten seconds worth of data. Since it is not possible in the present invention to implement the algorithms in that format, each of the algorithms 18 are modified to process one second worth of data at a time.

Figure 2:
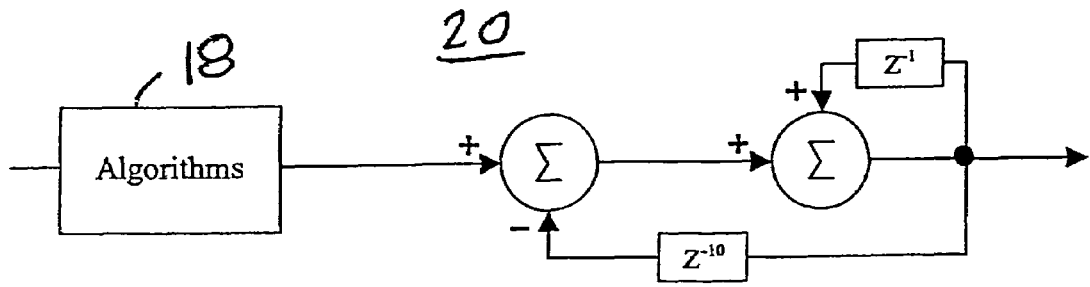
FIG. 2 shows an embodiment for the circular buffering system used in the system of the present invention.

A circular buffering system 20, which is illustrated in FIG. 2, is connected to the output of algorithms 18 to obtain the ten seconds of data that would be obtained from each algorithm 18. While FIG. 2 shows only one system 20 connected to the output of algorithms 18, those of ordinary skill in the art would appreciate that there is a system 20 for each of the algorithms.

System 20, as is shown in FIG. 2, removes the first value for each $10^{th}$ value added. The algorithm equations were modified to compensate for the errors introduced by the non-linearity due to chopping of the ten-second interval. The data acquired for each second is processed and used as an initial condition to compute the subsequent one-second data. The results are stored in a ten-second circular buffer used also as accumulator.

The modifications to the algorithms are as follows:

a. the calculation is performed for the $1^{st}$ one second interval and the output is stored as the accumulator first value;

b. the calculated output is also used as the initial input to calculate the 2nd one second interval and the output is stored as the second accumulator value; and c. the process continues until ten seconds are reached.

The eleventh one second is considered as the first second and the process is repeated as above. At any given time the total output is the summation of the ten buffer values.

In accordance with the present invention there is a fixed point implementation of each of the three high impedance fault detection algorithms. The algorithms were initially developed using floating-point arithmetic to verify and validate the concept then translated to fixed-point arithmetic for final implementation. Fixed-point digital signal processors are suitable for implementing a large volume of products economically because they are much cheaper, consume less power and execute faster than signal processors containing floating-point arithmetic units.

The code for each algorithm was implemented on a suitable central processing unit such as for example the Motorola ColdFire 5307 CPU with a clock speed of 66 MHz and a unified cache of 64 KB. The data acquisition is performed at a rate of 32 samples per second and the processing of the HIF algorithms is performed once per second in the highest priority task which is interrupted every 4.1 ms to perform data transfer from the DSP and protection algorithms.

Results from floating-point and fixed-point simulations were compared and showed no precision lost during the conversion.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A processing apparatus for determining the occurrence of a high impedance fault in an electrical power line comprising:

two buffers each for storing data collected from said power line for a first predetermined period of time indicative of current flow on said power line;

a plurality of high impedance fault detection means for individually detecting a high impedance fault on said power line, each of said high impedance fault detection means having an output and alternately processing for said first predetermined period of time said data stored in one of said two buffers and then said data stored in the other of said two buffers, each of said high impedance fault detection means providing at said output a signal based on said processed data indicative of the occurrence or non-occurrence of said high impedance fault; and a circular buffering system connected to said output of each of said high impedance fault detection means for producing an output signal indicative of the occurrence or non-occurrence of said high impedance fault that is based on said data collected for a second predetermined period of time that is n times said first predetermined period of time where n is an integer that is two or greater.

2. The processing apparatus of claim 1 further comprising a filter connected between said two buffers and said high impedance fault detection means.

3. The processing apparatus of claim 1 wherein said first predetermined period of time is one second and said integer is ten.

4. A processing apparatus for detecting a high impedance fault in an electrical power line, the apparatus comprising:

a pair of buffers for alternately storing data collected from the power line;

a plurality of high impedance fault detection means for independently determining whether a high impedance fault has occurred on the power line, each of the high impedance fault detection means alternately processing data from the buffers and producing a series of signals indicative of the occurrence or non-occurrence of the high impedance fault, each of the signals being based on data collected from the power line for a predetermined time interval; and a plurality of buffering systems connected to the plurality of high impedance fault detection means, respectively, wherein the buffering system for each high impedance fault detection means receives the series of signals from the high impedance fault detection means and uses the series of signals to produce an output signal indicative of the occurrence or non-occurrence of the high impedance fault.

5. The processing apparatus of claim 4, wherein each of the buffers are capable of storing data collected from the power line for the predetermined time interval.

6. The processing apparatus of claim 5, further comprising a first switch controlling the connection of the buffers to the collected data and a second switch controlling the connection of the buffers to the plurality of high impedance fault detection means, wherein when a first one of the buffers is filled, the first switch disconnects the first one of the buffers from the collected data and connects a second one of the buffers to the collected data, and the second switch connects the first one of the buffers to the plurality of high impedance fault detection means and disconnects the second one of the buffers from the plurality of high impedance fault detection means.

7. The processing apparatus of claim 6, wherein the series of signals produced by each of the high impedance fault detection means is a first series of signals, and wherein each of the high impedance fault detection means produces a second series of signals after having completed the first series of signals, and wherein each of the first and second series of signals comprises ten signals.

8. The processing apparatus of claim 7, wherein the buffering system for each high impedance fault detection means produces a second output signal using the second series of signals.

9. The processing apparatus of claim 8, wherein the predetermined time interval is one second.

10. The processing apparatus of claim 5, further comprising a filter connected between the buffers and the plurality of high impedance fault detection means.

11. The processing apparatus of claim 5, wherein the high impedance fault detection means comprise a wavelet based algorithm, a higher order statistics based algorithm and a neural network based algorithm, respectively.

* * * * *